No. 727,739. PATENTED MAY 12, 1903.
F. H. BLANDING.
ADJUSTING MEANS FOR CROSS HEAD SLIPPERS.
APPLICATION FILED MAR. 10, 1902.
NO MODEL.

WITNESSES
Walter F. Cane
D. B. Richards

INVENTOR
F. H. Blanding
by N. A. Acker
his Atty.

No. 727,739. Patented May 12, 1903.

UNITED STATES PATENT OFFICE.

FORREST H. BLANDING, OF SAN FRANCISCO, CALIFORNIA, ASSIGNOR TO WILLIS G. DODD, OF SAN FRANCISCO, CALIFORNIA.

ADJUSTING MEANS FOR CROSS-HEAD SLIPPERS.

SPECIFICATION forming part of Letters Patent No. 727,739, dated May 12, 1903.

Application filed March 10, 1902. Serial No. 97,427. (No model.)

*To all whom it may concern:*

Be it known that I, FORREST H. BLANDING, a citizen of the United States, residing in the city and county of San Francisco, State of California, have invented certain new and useful Improvements in Adjusting Means for Cross-Head Slippers; and I do hereby declare the following to be a full, clear, and exact description of the same.

The present invention is designed more especially for use in connection with cross-heads of steam-engines, the object being to provide tightening-locks for the adjusting-nuts, which compensate for the wear of the slippers or shoes of the cross-heads, whereby the adjusting-nuts are positively held locked in adjusted position, thereby preventing back working thereof during the operation of the cross-head.

Figure 1:
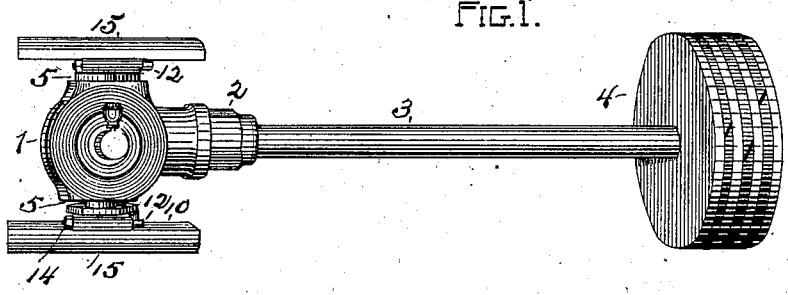
Figures 2, 3:
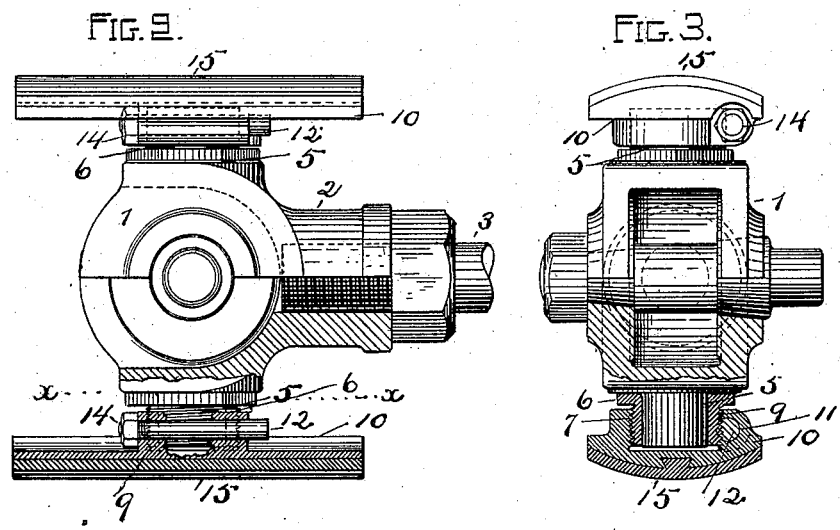
Figure 4:
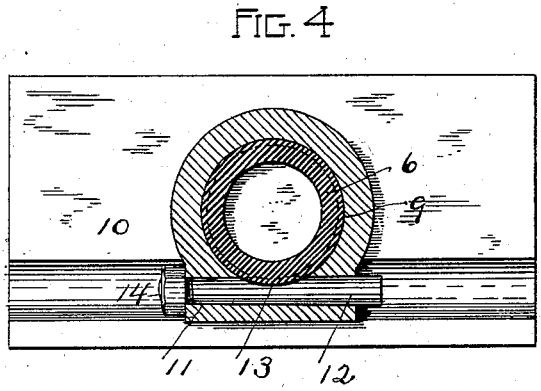

Referring to the accompanying drawings, forming a portion of this application, Figure 1 is a perspective view of the cross-head attached to the piston-rod and piston of a steam-engine; Figs. 2 and 3, enlarged detail views in part section of the cross-head, illustrating the position of the improved locking means for the adjusting-nuts; and Fig. 4 is an enlarged sectional top plan view on line *x x*, Fig. 2 of the drawings, illustrating one of the slippers or shoes and the adjusting-nut locked thereto.

The numeral 1 is used to indicate the cross-head proper, consisting of a box-casting of any suitable material. From this cross-head projects the boss 2, which is bored out and to which is securely fastened the piston-stem 3 of piston 4. This stem preferably screws into the bored-out boss. The cross-head is also provided with bosses 5, which stand at right angles to boss for the piston-rod. These bosses 5 are turned true, and upon same the adjusting bushing-nuts 6 are fit snugly.

The adjustable bushing-nuts are formed with exterior threads 7 and screw into the internally-screw-threaded seat 9 of the slippers or shoes 10. These slippers or shoes prior to the seat 9 being screw-threaded to receive the screw-threaded adjusting-nuts 6 have a longitudinal bore 11 drilled or reamed therein to admit of a tapered pin or bolt 12. After the pin or bolt 12 is inserted the screw-threaded seat 9 is cut in each shoe or slipper, in the boring of which a portion 13 of the pin or bolt 12 is cut away, thereby forming a thread thereon, with which the threads of the adjusting-nuts engage. Upon the completion of the screw-threaded seat the pin or bolt 12 is removed, and its bore or hole within which it fits is reamed out or slightly enlarged, permitting the tapered pin or bolt to seat itself farther in than when the thread was cut thereon. When the pin or bolt is again inserted, its smaller end 13, which is screw-threaded, projects slightly beyond the bore or opening 11 through which it fits. The adjusting-nuts 6 being screwed into their seats will engage the threads cut on the tapered pins or bolts. If the nuts 14 be then screwed onto the projecting end of the tapered pins or bolts, the same will be drawn inward, so as to tightly impinge against the adjusting-nuts and to firmly bind same and hold them against movement.

As the wearing face or sliding surface 15 of the slide shoes or slippers 10 become worn the tapered pins or bolts 12 are loosened and the bushing-nuts 6 unscrewed, thus forcing the slippers or shoes 10 outward, increasing the general diameter, as desired. The lock pins or bolts 12 are then drawn tight by means of the nuts 14 being screwed thereon, thereby locking the adjusting bushing-nuts 6 and maintaining the adjustment made.

By means of the described lock pin or bolt a positive adjustment may be given to the parts and danger of the same wearing loose is obviated.

Having thus described the invention, what is claimed as new, and desired to be protected by Letters Patent, is—

1. In combination with a cross-head having laterally-projecting bosses, of externally-screw-threaded nuts fitted upon said bosses, of slides or shoes having internally-screw-threaded seats within which the externally-screw-threaded nuts work so as to adjust the slippers or shoes vertically to compensate for wear of their surfaces, longitudinally-movable lock-bolts which engage with the screw-threaded nuts to hold the same against movement, and means for tightening or loosening the lock-bolt.

2. In combination with a cross-head having slides or shoes adjustably fitted thereto whereby they may be moved to compensate for the wear of their surfaces, nuts for adjusting said slides or shoes, a tapering bolt or pin screw-threaded at one portion of its diameter and adapted to engage said nuts to hold them in fixed position and a nut on said bolt or pin by which it is tightened or loosened.

3. The combination with a cross-head, of bosses projecting therefrom, externally-screw-threaded adjusting-nuts fitted to said bosses, cross-head slippers engaged by the adjustable nuts and held thereby to the cross-head, of means for locking the slippers to the adjusting-nuts, the same comprising a tapered pin or bolt fitted through a tapered bore of the slippers, a portion of the body of the tapered pin or bolt being screw-threaded so as to engage with threads cut on the adjusting-nuts, said nuts being held in their adjusted position by pressure of the tapered pin or bolt as drawn inward within its tapered seat.

In witness whereof I have hereunto set my hand.

FORREST H. BLANDING.

Witnesses:
N. A. ACKER,
D. B. RICHARDS.